Sept. 22, 1959  A. P. ARMINGTON  2,904,910
ANGLE BULLDOZER FOR FOUR-WHEEL STEER TRACTOR
Filed May 24, 1954  3 Sheets-Sheet 1
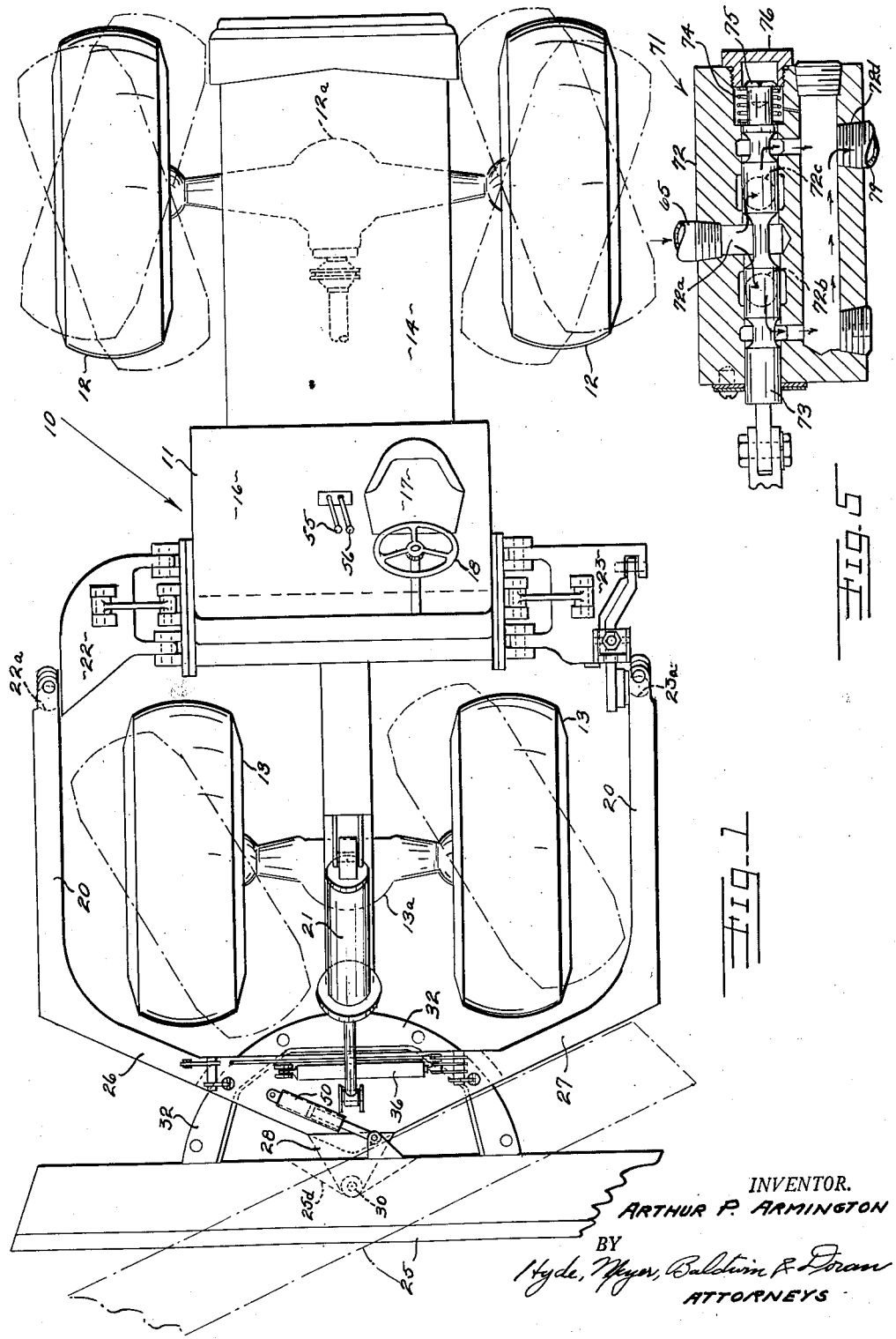
INVENTOR.
ARTHUR P. ARMINGTON
BY
Hyde, Meyer, Baldwin & Doran
ATTORNEYS Sept. 22, 1959    A. P. ARMINGTON    2,904,910
ANGLE BULLDOZER FOR FOUR-WHEEL STEER TRACTOR
Filed May 24, 1954    3 Sheets-Sheet 2
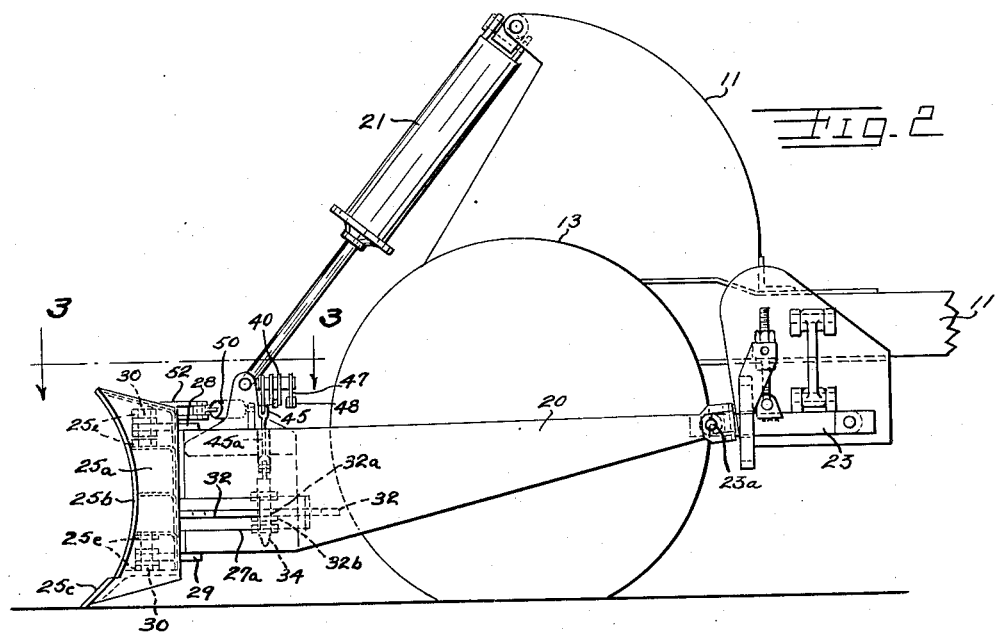
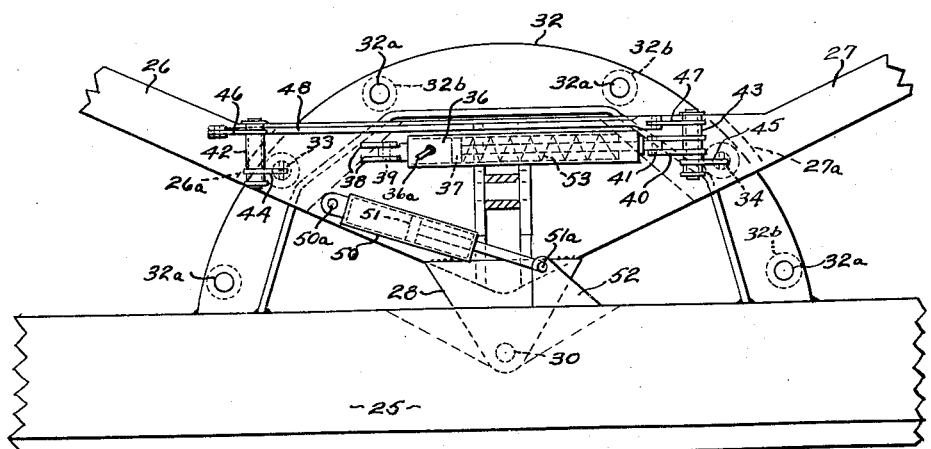
INVENTOR.
ARTHUR P. ARMINGTON
BY
ATTORNEYS

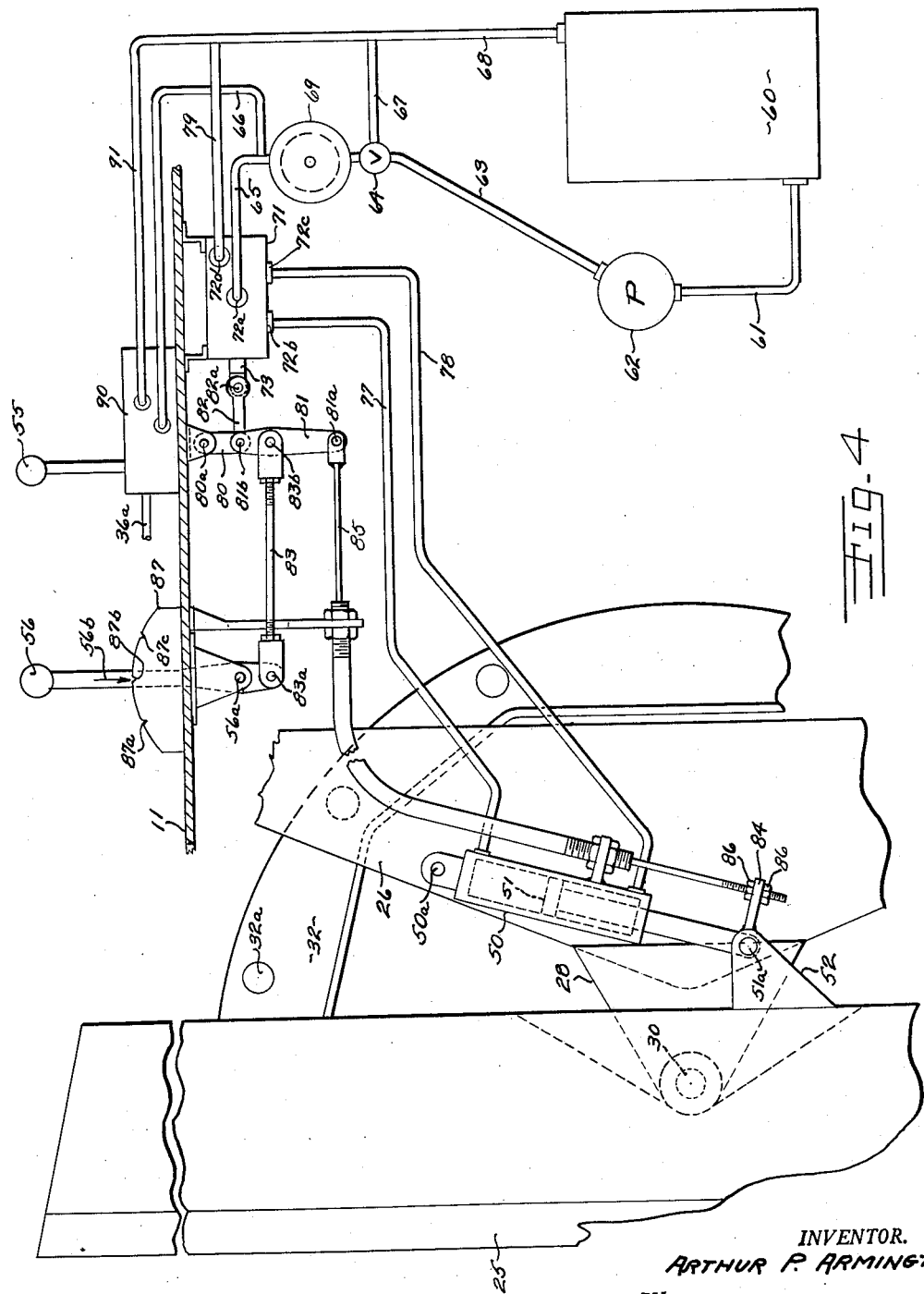

United States Patent Office 2,904,910
Patented Sept. 22, 1959

2,904,910
ANGLE BULLDOZER FOR FOUR-WHEEL STEER TRACTOR

Arthur P. Armington, Willoughby, Ohio, assignor to General Motors Corporation, Detroit, Mich., a corporation of Delaware Application May 24, 1954, Serial No. 431,735

8 Claims. (Cl. 37—144)

This invention relates to improvements in a bulldozer blade construction and more particularly to a bulldozer blade swingable about a generally vertical axis for angle dozing by a four-wheel steer tractor.

One of the objects of the present invention is to provide a blade that is power actuated in moving from one angular position to another instead of being manually positionable.

A further object of the present invention is to provide an angle bulldozer blade for a tractor steerable to balance side thrust without loss of tractive power.

A further object of the present invention is to provide a power actuated blade controlled from the tractor driver's seat with this power actuation capable of moving the blade from one angular position to another relative to the direction of travel of said tractor.

A further object of the present invention is to provide an indicator means visible from the driver's seat for indicating the angular position of said blade when alignment in this angular position cannot be adequately seen from the driver's seat.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a top plan view of a tractor having the bulldozer blade of the present invention mounted on the front thereof;

Fig. 2 is a fragmental side elevational view taken from the right in Fig. 1 showing the forward portion of the tractor;

Fig. 3 is an enlarged top plan view of the portion immediately ahead of the front wheels of the tractor in Fig. 1;

Fig. 4 is a hydraulic diagram of one form of control for the bulldozer blade; while Fig. 5 is a longitudinal central sectional view through one of the control valves in Fig. 4.

Those familiar with this art will recognize that the present invention may be applied in many ways. Although the presently disclosed blade construction may be used on any type of propelling vehicle, such as a bulldozer type vehicle, I have chosen to illustrate the same here in connection with the four-wheel steer and four-wheel drive tractor disclosed in my copending U.S. patent application, Serial No. 350,446, filed April 22, 1953, and entitled "Four-Wheel Drive Tractor Grader."

The tractor is generally shown at 10 in Fig. 1 and has a frame 11 having mounted thereon a rear pair of wheels 12, 12 and a front pair of wheels 13, 13. A motor 14 drives each pair of wheels through their respective differentials 12a and 13a so that the tractor is a four-wheel drive vehicle. Each pair of wheels is also steerable independently as shown by the dot-dash line positions in Fig. 1 so that the tractor is also a four-wheel steer vehicle. An operator's or driver's station 16 is located on the tractor frame 11 and has a seat 17 with a steering wheel 18 mounted in front thereof.

A bulldozer blade 25 is supported at the front of the tractor by a blade mounting frame member including rearwardly extending push beams 20, 20. The rear end of each push beam is mounted on the tractor by pivotal connections 22a and 23a of laterally extending brackets 22 and 23. Then, a fluid pressure actuated, double acting hoist 21 in Figs. 1 and 2 can be used to raise or lower the blade 25 about the pivots 22a and 23a. The bracket 23 can be either the rigid type shown at 22 or the tilting type illustrated in Fig. 1 and disclosed more fully in my copending U.S. patent application, Serial No. 407,744, now Patent No. 2,837,845, filed February 2, 1954, and entitled "Tilting Device for Bulldozer Blade."

In the present invention, the bulldozer blade 25 is mounted on the tractor frame 11 by a generally V-shape blade mounting frame member formed by arms 26 and 27 connected together at their forward ends and diverging rearwardly with each arm connected to the forward end of one of the push beams 20 to complete the blade mounting frame member construction.

The blade 25 in Fig. 2 comprises a frame 25a having an arcuately shaped mold board 25b secured to the front thereof and a detachable cutting edge 25c mounted on the lower front edge thereof with this cutting edge having a straight leading edge for performing the cutting function. This blade 25 is mounted in operative position on the tractor immediately in front of and adjacent the front pair of steerable wheels 13, 13.

The blade 25 is connected to its mounting frame member so that it is capable of swinging around a generally vertical axis when the push beams 20 are in the Fig. 2 position. In the present disclosure, a pair of vertically spaced, generally triangular shaped lugs 28 and 29 are welded to the junction point of the arms 26 and 27 of the mounting frame, with each extending forwardly into an enlarged recess 25d (Fig. 1) in the back of the blade 25 and there pivotally secured between a pair of vertically spaced mounting lugs 25e (Fig. 2) by vertically extending pivot pins 30. This pivotal connection is located near the vertex of the V formed by the mounting frame member arms 26 and 27 so that the blade 25 can be swung around the axis formed thereby.

Locking means is provided for locking the blade 25 to its mounting frame arms 26, 27 at any one of three or more preselected positions with only three shown in the drawings. The blade 25 may assume one extreme angle position shown by dot-dash lines in Fig. 1, an intermediate position shown by solid lines with the blade not angled but extending perpendicular to the longitudinal center line of tractor 10, or an angle position in the opposite direction. In each angle position, the blade 25 is generally parallel to one of the mounting frame arms 26 or 27 in Fig. 1 and is angularly inclined with respect to the longitudinal center line of the tractor 10 with one blade end ahead of the other. An arcuately shaped member 32 in Fig. 1, nearly semi-circular in extent, has its opposite ends secured to the back of the blade 25 with this member 32 extending horizontally through slots 26a and 27a in the arms 26 and 27 in Figs. 2 and 3 so that the arcuately shaped member 32 extends across the arms 26 and 27 of this V-shape blade mounting frame member. The member 32, with its center of arcuate curvature at the pivotal axis 30, has a plurality of lock pin holes 32a formed therein, each reinforced by a collar 32b secured to the bottom surface of said member 32. A lock pin means is carried by the blade mounting frame member arms 26 and 27 for engaging one or more of these lock pin holes 32a for locking the blade 25 in a desired position. In the present disclosure, this lock pin means takes the form of a lock pin, 33 or 34, carried by each arm 26 or 27 and mounted for vertical movement relative thereto for advancement into or retraction from any suitably aligned lock pin hole. Hence, since a pair of lock pins 33 and 34 in Figs. 2 and 3 are used, two lock pin holes 32a are required to locate each position of the blade 25. Hence, a total of six lock pin holes 32a are required to locate the three different positions mentioned heretofore.

Power means or power operable lock pin actuating means is provided for simultaneously retracting both lock pins 33 and 34 for unlocking this locking means so that the blade 25 can be swung around its pivotal axis 30. This takes the form of a fluid pressure operable cylinder 36 in Fig. 3 and a reciprocating piston 37 and piston rod as a single acting fluid pressure operated unit driven in the expandable direction by any suitable fluid pressure, such as the oil of a hydraulic system. The left end of the cylinder 36 is pivotally connected by a pin 39 to two spaced lugs 38 secured to blade mounting frame member arm 26 while the right end of the piston rod 37 is pivotally connected by a pin 41 to a crank arm 40 by a clevis type connection. Rotatably mounted in suitable brackets on frame member arms 26 and 27 are sleeves 42 and 43 with crank arm 40 secured to the sleeve 43. These sleeves 42 and 43 have respectively bell crank arms 44 and 45 connected respectively to lock pins 33 and 34 at their outer ends by connecting links 44a and 45a having pivotal connections at opposite ends. Sleeves 42 and 43 also have bell crank arms 46 and 47 connected at their outer ends by a connecting rod 48 having pivotal connections at opposite ends. It should be now from an examination of Figs. 2 and 3 that supplying pressure fluid to the left end of the cylinder 36 through conduit 36a will expand the cylinder and piston unit 36, 37 so as to raise the lock bolts 33 and 34 from the Fig. 2 position and retract them from the aligned lock pin holes 32a.

Power means or power turning means is provided for swinging the blade 25 about the vertical axis formed by the pins 30 between extreme positions angled in opposite directions. This takes the form, in Fig. 3 of the present disclosure, of a fluid pressure operated cylinder 50 and piston and piston rod 51 respectively operatively connected to arm 26 of the blade mounting frame by pivot 50a and by pivot 51a to the distal end of a rearwardly projecting lug 52 fixed to the rear surface of the blade 25 in Fig. 3.

Power means is provided for locking the locking means. As the blade 25 is being swung around the vertical axis, the fluid pressure in the lock pin operating cylinder 36 is released so that a spring 53, in Fig. 3, telescoped over the piston rod and located between the piston 37 and the right end of the cylinder 36, coacts with the lock pin operating linkage to serve as a spring powered return means or power means for biasing the lock pins 33 and 34 downwardly toward and resiliently against the top surface of the arcuately shaped member 32. As the movement of the piston rod 51 continues to swing the blade 25 about the vertical axis, the member 32 slides across the bottom noses of lock pins 33 and 34 until a pair of lock pin holes 32a move into alignment with the lock pins 33 and 34. Then, the resiliency of the spring 53 snaps the lock pins into fully seating engagement in said holes for locking the blade in the preselected one of the three aforementioned positions. Then, the blade 25 is rigidly held in position so that the tractor operator can bull-doze satisfactorily.

Of course, this lock pin return spring 53 may be located outside of the cylinders 36 and still perform the same function, but the illustrated construction is more compact and is preferred.

The present construction permits the blade 25 to be power actuated when being swung between the three positions as contrasted with manual positioning of most blades. This power positioning or swinging of the bulldozer blade increases the utility of the bulldozer greatly since the time and effort required to position the blade 25 manually is considerable.

Each fluid pressure operated cylinder is provided with means for manually controlling it from the vehicle operator's station 16 in Fig. 1. This takes the form of a control lever 55 for controlling the flow only to the fluid pressure operated lock pin actuating cylinder 36 and a control lever 56 for controlling the flow only to a fluid pressure operated turning cylinder 50. Hence, the bulldozer operator can retract the lock bolts, turn the blade 25, and then lock the blade in any of three desired positions while he remains in his regular driving seat 17.

Since the construction of most vehicles would make it impossible for the operator to see if the lock pins 33 and 34 were properly aligned in their holes 32a to determine one of the three preselected blade positions, indicator means is provided for aiding the operator. This indicator means is responsive to the position of the blade 25 for indicating its presence at one of these three preselected positions with this indicating means being visible and usable from the operator's seat 17.

The hydraulic diagram in Fig. 4 and the flow valve in Fig. 5 disclose more fully the manual control means for the two fluid pressure operated cylinders and disclose the indicator means previously mentioned. The fluid, such as hydraulic oil, is stored in the reservoir 60 and is pumped by a continuously operating fluid pump 62 up through conduits 61 and 63 through a valve 64 into a fluid pressure accumulator 69 for charging the accumulator. This accumulator 69 may be of any conventional design, such as an outer housing having therein a flexible bag filled with a compressible gas entrapped under pressure with the outer surface of this bag in contact with fluid of the system. The compressibility of the gas makes it possible to store a quantity of the incompressible hydraulic oil in the accumulator during periods of low demand and then return it to the system under pressure by the compressed gas when demand exceeds the pump capacity. The valve 64 is an unloading valve for returning the fluid to reservoir 60 through return conduits 67, 68 when accumulator 69 is charged to full capacity. Hence, there is no danger of shearing the lock pins 33, 34 or damaging the blade actuating mechanism. Then, the fluid flows into a conduit 65 for actuating the blade turning cylinder 50 and into a conduit 66 for actuating the lock pin actuating cylinder 36.

The pressure fluid traveling to the blade turning cylinder 50 emerges from conduit 65 in Fig. 4 into a control valve 71. This valve 71 includes a valve body 72 in Fig. 5, having a spring loaded valve stem 73 reciprocable therein and normally biased to a central or neutral position corresponding to the Fig. 5 illustration. A spring 74 surrounds one end of the stem and is retained thereon between a washer abutting a shoulder on the stem and a washer locked in place by nut 75 screwed onto said stem with the washer on the right in Fig. 5 normally bearing against the left or inner face of a centering stop plug 76 detachably secured in the valve body 72. The valve body 72 includes an inlet port 72a connected to the conduit 65, parts 72b and 72c connected respectively by conduits 77 and 78 in Fig. 4 with the ports on the opposite ends of the fluid pressure operated blade actuating cylinder 50, and an exhaust port 72d for returning fluid back to the reservoir 60 by conduits 79 and 68 in Fig. 4. Grooves are provided in the valve stem 73 of Fig. 5 and the valve body bore so that endwise reciprocation of the valve stem 73 will move the grooves into and out of registration for cutting off or permitting flow between the different valve body ports.

When the valve body stem 73 is in the central position shown in Fig. 5, which is its normal position under the bias of spring 74, the valve stem 73 cuts off fluid flow from pump 62 to the blade turning cylinder 50 through valve ports 72b and 72c and also cuts off the exhaust flow to the reservoir 60 through valve port 72d.

The valve stem 73 in Fig. 5 can be reciprocated relative to the valve body 72 to either of two operating positions on opposite sides of the illustrated central position, one on the left and the other on the right thereof, with each position supplying pressure fluid to the blade turning cylinder 50 for turning the blade in opposite directions. When the valve stem 73 is moved to the right of center, it should be apparent that fluid pressure flow takes place through conduit 65, inlet port 72a in Fig. 5, port 72c, conduit 78 in Fig. 4 into the lower end of the fluid pressure operated cylinder 50 to urge the piston 51 upwardly and thus rotate the blade 25 counterclockwise, as viewed in Fig. 4, by shortening the piston and cylinder unit. The pressure fluid in the upper end of the cylinder 50 is then exhausted through the conduit 77, port 72b in Fig. 5, along the direction of the flow arrows out through the exhaust port 72d, and through conduits 79 and 68 to the reservoir 60 in Fig. 4.

It should be apparent that moving the valve stem 73 to the left will cause in a similar manner a lengthening of the fluid pressure operated cylinder and piston unit 50 and 51 by exhausting the lower side of the cylinder 50 in Fig. 4 while fluid pressure is admitted to the upper side thereof so as to turn the blade 25 clockwise. During either movement, spring 74 in Fig. 5 is compressed, either by the shoulder and washer on the left on valve stem member 73 or by the washer on the right secured thereto by nut 75, so that the valve stem 73 is always resiliently urged back toward its central, flow cut-off position illustrated in Fig. 5.

This valve 71 is actuated through a linkage by suitable manual actuating means, such as the control lever 56 in Fig. 4. The tractor frame 11 has fixed thereto the lever pivotal mounting 56a, the pivotal mounting 80a of a link 80, and the valve 71. The linkage also includes links 81, 82 and 83. Link 81 is pivotally connected at its lower end by pivot 81a to a member to be described in more detail hereinafter and at its upper end by pivot 81b to separate links 80 and 82. Link 82 is pivotally connected at its right end at 82a to the valve stem 73. The connecting link 83, adjustable in length, is pivotally connected at its left end at 83a to the lower end of the control lever 56 and is pivotally connected at its right end at 83b to the link 81. Although pivot 81a can move generally left and right in an approximate arcuate path about one of the other pivots 81b or 83b, assume for the sake of simplicity of description that the pivot 81a is the center and cannot move substantially in a horizontal direction for any given position of the blade 25 but has some vertical movement when required by the arcuate movement of toggle links 80, 81 as will be more apparent later in the description. Then, turning the control lever 56 toward the left in a counterclockwise direction will move connecting link 83 toward the right so as to cause the toggle links 80 and 81 to also move the valve stem 73 toward the right and thereby the blade 25 in a counterclockwise direction in Fig. 4. In similar manner, movement of the lever 56 toward the right will correspondingly turn the blade 25 in the clockwise direction.

This linkage and aforedescribed construction provides common parts not only for the power blade turning means but also for the blade position indicator means. In the illustrated construction, the position of the valve and blade turning control lever 56, serving as both an indicator and power control part, reflects by "follow-up" and servocontrol the movement of the piston 51 and hence the position of the blade 25. A follow-up linkage is provided by an armored push-pull cable 85 pivotally connected at its upper right end by pivot 81a to link 81 and at its lower left end adjustably connected by lock nuts 86, 86 to a lug 84 secured to and laterally extending from the piston rod 51. The lateral flexibility of this cable 85 and endwise rigidity holds the pivot 81a against horizontal movement for any given position of the blade 25 but permits limited vertical movement in response to the movement of toggle links 80, 81. The movement of blade 25 is reflected through the push-pull cable 85 to pivot 81a. When the bulldozer operator releases control lever 56, the valve spring 74 in Fig. 5 returns the valve stem 73 to its central position to cut off flow, and the linkage readjusts itself to the new location of pivot 81a so that lever 56 is no longer at its original position before movement of blade 25. After lever 56 has been released at the will of the operator, pointer 56b or other suitable indicator means, on the manual control lever 56 will be aligned with one of the indicator marks 87a, 87b or 87c on index plate 87 fixed to the frame 11 if the blade 25 is in one of the three final positions of said blade wherein the lock pins 33 and 34 are in alignment with lock pin holes 32a. If control lever 56 is released by the operator before blade 25 has reached one of the positions indicated by said indicator marks, the toggle 80, 81 assumes again a straight position. This is because valve spring 74 not only shifts valve 73 to its neutral position, but also causes the toggle to move from its break position to a straight position. Therefore, control lever 56 will stay in an intermediate position corresponding to the achieved turning position of blade 25. The three indicator marks 87a, 87b and 87c correspond with the three positions of blade 25 determined by engagement of the lock pins. If blade 25 has not been swung to the proper alignment position, movement of the control lever 56 in the proper direction can be easily made to bring the lock pins and lock pin holes into alignment. If the solid line final position of the blade in Figure 1 is desired, swinging lever 56 into actuated position in alignment with mark 87b corresponding to this final position and holding lever 56 there will cause the blade to move to this final position.

Hence, a common resilient means, here shown as spring 74, can be used: (1) for deactivating the power turning means by moving valve stem 73 to a central or flow cut-off position, and (2) for moving lever 56 of the indicating means into position indicating relationship upon lever release by the operator.

After the blade 25 has been swung to the proper position, the spring 53 in Fig. 3 will bias the lock pins 33 and 34 into the proper lock pin holes 32a after fluid pressure has been removed from the left end of the lock pin actuating cylinder 36.

The single acting lock pin actuating cylinder 36 in Fig. 3 receives its fluid pressure from conduit 66 in Fig. 4 through valve 90, controlled by control lever 55, and conduit 36a in Figs. 3 and 4. The fluid is exhausted from the cylinder 36 back through conduit 36a, valve 90 and conduits 91 and 68 so as to return to the reservoir 60. This control valve 90 may take any conventional form or may be constructed like one-half of the control valve 71 in Fig. 5 so that actuation of the lever 55 will cause the pressure fluid either to flow to or to flow from the lock pin actuating cylinder 36.

With the indicator means, it is possible to have the lock pin actuating cylinder 36 of double acting construction with spring 53 eliminated since the lock pin and lock pin holes could then be accurately aligned before control lever 55 were actuated to positively engage the lock pins in their respective lock pin holes.

The mechanism can also be actuated without the indicator means when desired. Then, the connecting rod 83 in Fig. 4 is directly pivotally connected to the valve stem 73 with the elimination of links 80, 81 and 82 as well as the push-pull cable 85. Then, the operator actuates the control lever 55 to withdraw the lock pins 33 and 34 from their respective lock pin holes. Control lever 56 is actuated to turn the blade 25 by the cylinder and piston unit 50, 51. As the blade 25 approaches the desired position, the control lever 55 is again actuated to drain the fluid pressure from the lock pin actuating cylinder 36 so that the spring 53 presses the lock pins down against the top surface of the member 32. Then, the operator finds the alignment position by "feel." As the return spring forces the tapered lower ends of the lock pins 33 and 34 into the lock pin holes, the operator releases the control lever 56 so that the seating of the lock pins accurately positions and locks the blade 25 in the proper position.

This construction has additional advantages when used on a tractor, such as tractor 10 in Fig. 1, with a four-wheel drive, a four-wheel steer, and a differential between the driving motor and each pair of wheels. When the blade 25 is angled to the dot-dash line position in Fig. 1, or to the corresponding position on the other side of center, the bulldozing action exerts a force on the blade generally normal to the front straight edge of the blade and this acts along parallel lines of force inclined with respect to the longitudinal center line of the tractor 10 so that the tractor must be steered in the direction opposite to these lines of force to compensate for this bulldozing force tending to shift the tractor laterally. When an angle dozer blade is used on a crawler tractor, for example, the steering operation is generally performed by slowing down one tractor tread so as to overcome this bulldozing force. Hence, steering causes a loss of tractive power and slows down the bulldozing operation.

In contrast, the tractor 10 in Fig. 1 has four-wheel steer and four-wheel drive. Hence, the steered wheels are always operating up to speed so as to put full tractive effort behind the bulldozer blade 25 even in an angled position.

Having the two front wheels 13, 13 power driven also offers advantages. If only the rear wheels 12, 12 were power driven and the front wheels were merely steering wheels, these front wheels 13, 13 would have to rely entirely on skidding friction with the ground to provide the force to overcome the side thrust exerted by the angle bulldozer blade 25. The steered, but not driven, front wheels would then steer and overcome the side thrust only because the vehicle would find it easier to follow the direction of least resistance by having the wheels roll over the ground. The motor driven front wheels 13, 13 in the present disclosure can be positively driven while steered in the direction opposing the bulldozing force so that they oppose this force by not only skidding but also driving friction.

The differentials 12a and 13a through which the wheels are driven permit one wheel to go faster than the other if necessary to compensate for turning or any side slippage of the vehicle. Hence, maximum tractive effort is always exerted by the wheels 12 and 13 under all conditions. If the rear wheels 12 are constructed to drive only but not to steer, they could take the form of any type rolling support means. However, a four wheeled vehicle is the preferred construction.

In the four-wheel drive and four-wheel steer tractor 10, the power drive on the steered front wheels 13 tends to drive positively the front of the tractor in the direction steered, to directly counteract the side thrust of the angle blade 25 instead of relying solely upon the skidding frictional contact between the wheels and the ground. The differentials 12a and 13a aid the steering action when necessary. The four-wheel steer has an advantage when it is necessary to overcome a greater side thrust since the whole vehicle, that is, both ends, can be steered to counteract the side thrust.

The four-wheel steer, four-wheel drive features of the tractor combined with the power locking and unlocking of the bulldozer blade and power turning of said blade make a versatile tool, each feature tending to enhance the value of the whole. Therefore, it is worthwhile to have power movement on the position of the blade 25.

Some aspects of this invention may be advantageously used when any type implement imposes side draft forces on the propelling vehicle. The implement may take the form of any type material engagement means including V-shaped or angle type snow plow blades, moldboard plow blades, bulldozer blades, etc.

Various changes in details and arrangement of parts can be made by one skilled in the art without departing from either the spirit of the invention or the scope of the appended claims.

What I claim is:

1. In combination, a blade, a blade mounting frame of generally V-shape opening away from said blade for mounting said blade in operative position on a propelling vehicle, a pivotal connection between said blade and mounting frame near the vertex of said V so that the blade can be swung around the axis formed thereby, said blade having an arcuately shaped member extending across the arms of said V-shape frame and attached to the blade side opposite from the material engaging side with its center of curvature at said pivotal connection, alignable lock pin holes on said arcuately shaped member determining at least two blade positions with an arm of said V-shape frame being generally parallel with said blade in each extreme position, and a lock pin carried by each of said V arms and advanceable into or retractable from any suitably aligned lock pin hole.

2. In combination, a blade, a blade mounting frame of generally V-shape opening away from said blade for mounting said blade in operative position on a propelling vehicle, a pivotal connection between said blade and mounting frame near the vertex of said V so that the blade can be swung around the axis formed thereby, said blade having an arcuately shaped member extending across the arms of said V-shape frame and attached to the blade side opposite from the material engaging side with its center of curvature at said pivotal connection, alignable lock pin holes on said arcuately shaped member determining at least three blade positions with an arm of said V-shape frame being generally parallel with said blade in each extreme position, and a lock pin carried by each of said V arms and advanceable into or retractable from any lock pin hole when suitably aligned, and lock pin actuating means fixed relative to said arms and interconnecting said lock pins for simultaneously retracting both lock pins.

3. In combination, a blade, a blade mounting frame for mounting said blade in operative position on one end of a propelling vehicle outside of the wheel base of said vehicle, a pivotal connection between said blade and mounting frame so that the blade can be swung around the axis formed thereby, said blade having an arcuately shaped member attached to the side opposite from the material engaging side with its center of curvature at said pivotal connection, said arcuately shaped member having alignable lock pin holes extending parallel to said axis determining at least two blade positions and having a smooth surface connecting said holes, a lock pin carried by said frame member in alignment with said holes and surface during blade swing and advanceable into or retractable from any of said lock pin holes when suitably aligned, said lock pin holes being spaced apart a distance substantially greater than the width of said pin, power operable lock pin actuating means on said frame movable between one position for retracting said lock pin and another position to permit pin advance, and spring powered return means for biasing said pin in the advancing direction toward said arcuately shaped member for sliding contact with said surface during swinging of said blade and for snapping said pin into said lock pin hole when properly aligned.

4. In combination, a blade, a blade mounting frame for mounting said blade in operative position on one end of a propelling vehicle outside of the wheel base of said vehicle, a pivotal connection between said blade and mounting frame so that the blade can be swung around the axis formed thereby, said blade having an arcuately shaped member attached to the blade side opposite from the material engaging side with its center of curvature at said pivotal connection, alignable lock pin holes on said arcuately shaped member determining at least two blade positions, a lock pin carried by said frame member and advanceable into or retractable from any of said lock pin holes when suitably aligned, power operable lock pin actuating means for retracting or releasing said lock pin, spring powered return means for biasing said pin toward said arcuately shaped member for sliding contact therewith during swinging of said blade and for snapping said pin into said lock pin hole when properly aligned, and power turning means operable independently of said lock pin actuating means and connecting said blade and mounting frame for turning said blade about said pivot while said lock pin is biased into sliding contact with said arcuately shaped member until the lock pin aligns with and snaps into one of said holes.

5. In combination, a blade, a blade mounting frame of generally V-shape opening away from said blade for mounting said blade in operative position on a propelling vehicle, a pivotal connection between said blade and mounting frame near the vertex of said V so that the blade can be swung around the axis formed thereby, said blade having an arcuately shaped member extending across the arms of said V-shape frame and attached to the blade side opposite from the material engaging side with its center of curvature at said pivotal connection, alignable lock pin holes on said arcuately shaped member determining at least three blade positions with an arm of said V-shape frame being generally parallel with said blade in each extreme position, a lock pin carried by each of said V arms and advanceable into or retractable from any lock pin hole when suitably aligned, power operable lock pin actuating means for simultaneously retracting or releasing both lock pins, spring powered return means for biasing said pins toward said arcuately shaped member for sliding contact therewith during swinging of said blade and for snapping said pin into lock pin holes when properly aligned, and power turning means operable independently of the position of said lock pin and connecting said blade and mounting frame for turning said blade about said pivot while said lock pin is biased into sliding contact with said arcuately shaped member until the lock pins align with and snap into some of said holes.

6. In combination, a blade, a blade mounting frame of generally V-shape opening away from said blade for mounting said blade in operative position on a propelling vehicle, a pivotal connection between said blade and mounting frame near the vertex of said V so that the blade can be swung around the axis formed thereby, said blade having an arcuately shaped member extending across the arms of said V-shape frame and attached to the blade side opposite from the material engaging side with its center of curvature at said pivotal connection, alignable lock pin holes on said arcuately shaped member determining at least three blade positions with an arm of said V-shape frame being generally parallel with said blade in each extreme position, and a lock pin carried by each of said V arms and advanceable into or retractable from any lock pin hole when suitably aligned, and lock pin actuating means for simultaneously retracting both lock pins, said lock pin actuating means including a pair of spaced apart bell cranks with one pivotally mounted on each frame arm and to each lock pin, and including a fluid pressure operated piston and cylinder unit operatively connected to and located between said bell cranks for simultaneously retracting both lock pins.

7. In combination, a blade, a blade mounting frame for mounting said blade in operative position on one end of a propelling vehicle outside of the wheel base of said vehicle, a pivotal connection between said blade and mounting frame so that the blade can be swung around the axis formed thereby, said blade having an arcuately shaped member attached to the side opposite from the material engaging side with its center of curvature at said pivotal connection, alignable lock pin holes on said arcuately shaped member determining at least two blade positions, a lock pin carried by said frame member and advanceable into or retractable from any of said lock pin holes when suitably aligned, said lock pin holes being spaced apart a distance substantially greater than the width of said pin, power operable lock pin actuating means for retracting said lock pin, and spring powered return means for biasing said pin toward said arcuately shaped member for sliding contact therewith during swinging of said blade and for snapping said pin into said lock pin hole when properly aligned, said lock pin actuating means including a single action piston and cylinder unit for fluid pressure actuated lock pin retraction, said piston having a piston head and piston rod, said spring powered return means including a helical spring telescoped over said piston rod and located between said piston head and one end of the cylinder.

8. In combination, a propelling vehicle with an operator's station thereon, a blade, a blade mounting frame for mounting said blade in operative position on said vehicle, a pivotal connection between said blade and mounting frame so that the blade can be swung around the axis formed thereby, power means for unlocking and locking said blade, hydraulic power means for turning said blade about its swing axis to desired positions, means for controlling said power means, other control means for controlling said hydraulic power means, said other control means including reciprocal valve means and manual means for actuating said valve means, said valve means being connected to said manual actuating means by a linkage including a toggle, said toggle having a median pivot between two outer pivots, said valve means being connected to said median pivot, the first of said outer pivots having a stationary axis, a followup mechanism between said hydraulic power means and said manual actuating means for reflecting the position of said blade at said operator's station, said followup mechanism including a flexible cable one end of which is attached to said hydraulic power means and the other end being connected to the second of said outer pivots of said toggle to move the latter in response to movement of said blade about the first outer pivot, biasing means operatively connected to said valve means for returning it from opposite power-activating positions to an intermediate non-activating position, said toggle being in a straight position when said valve is in said non-activating position and in a break position when said valve is in said power activating positions, said valve biasing means upon release of said manual activating means causing said toggle to assume again the straight position so that the manual actuating means will stay in a position corresponding to the achieved turning position of said blade, and indicating means operatively connected with said manual actuating means for visually indicating the true position of said blade when said manual actuating means is released.

References Cited in the file of this patent

UNITED STATES PATENTS

| | | |
|---|---|---|
| 1,861,731 | Wooldridge | June 7, 1932 |
| 2,088,564 | Anthony et al. | Aug. 3, 1936 |
| 2,160,595 | Le Bleu | May 30, 1939 |
| 2,195,607 | Wilson et al. | Apr. 2, 1940 |
| 2,231,875 | Behnke et al. | Feb. 18, 1941 |
| 2,242,826 | Keeler | May 20, 1941 |
| 2,251,452 | Hirst | Aug. 5, 1941 |
| 2,515,395 | Court | July 18, 1950 |
| 2,624,131 | Rockwell | Jan. 6, 1953 |
| 2,698,919 | LeTourneau et al. | Jan. 4, 1955 |
| 2,702,952 | LeTourneau | Mar. 1, 1955 |
| 2,732,963 | Grubich | Jan. 31, 1956 |
| 2,763,331 | LeTourneau | Sept. 18, 1956 |